(12) United States Patent
Mizutani et al.

(10) Patent No.: US 7,109,617 B2
(45) Date of Patent: Sep. 19, 2006

(54) MOTOR AND METHOD FOR MANUFACTURING MOTOR

(75) Inventors: Nobuo Mizutani, Toyohashi (JP); Naoki Imamura, Kosai (JP)

(73) Assignee: ASMO Co., Ltd., Shizuoka-Pref (JP)

( * ) Notice: Subject to any disclaimer, the term of this patent is extended or adjusted under 35 U.S.C. 154(b) by 0 days.

(21) Appl. No.: 10/530,545

(22) PCT Filed: Nov. 12, 2003

(86) PCT No.: PCT/JP03/14402

§ 371 (c)(1),
(2), (4) Date: Apr. 7, 2005

(87) PCT Pub. No.: WO2004/047254

PCT Pub. Date: Jun. 3, 2004

(65) Prior Publication Data

US 2006/0055257 A1 Mar. 16, 2006

(30) Foreign Application Priority Data

Nov. 19, 2002 (JP) ............................. 2002-334797
Oct. 20, 2003 (JP) ............................. 2003-360031

(51) Int. Cl.
*H02K 5/22* (2006.01)
*H02K 15/14* (2006.01)
(52) U.S. Cl. .................. 310/71; 310/75 R; 310/83; 310/89; 310/239; 29/596
(58) Field of Classification Search .................. 310/71
See application file for complete search history.

(56) References Cited

U.S. PATENT DOCUMENTS 5,025,184 A * 6/1991 Sekine et al. ................ 310/71
5,444,315 A * 8/1995 Adam et al. .................. 310/42
5,528,093 A * 6/1996 Adam et al. .................. 310/89
6,107,713 A * 8/2000 Hulsmann et al. ........ 310/75 R
6,201,326 B1 * 3/2001 Klappenbach et al. .... 310/75 R
6,242,824 B1 * 6/2001 Torii et al. .................... 310/42

(Continued)

FOREIGN PATENT DOCUMENTS

JP    U-H04-80260    7/1992

(Continued)

OTHER PUBLICATIONS

Notification of Transmittal of Copies of Translation of the International Preliminary Report of Patentability of Sep. 29, 2005, issued from International Bureau of PCT for the corresponding application No. PCT/JP2003/014402 (copy of original document is enclosed).

*Primary Examiner*—Burton Mullins
(74) *Attorney, Agent, or Firm*—Posz Law Group, PLC (57) ABSTRACT

A holder-side connecting portion 10c provided on a brush holder 10 and a connector-side connecting portion 16b provided on a connector portion 16 are electrically and mechanically connected with each other. The holder-side connecting portion 10c and the connector-side connecting portion 16b are clamped between a yoke housing 4 and a gear housing 21. For this reason, the connecting portions 10c and 16b for connecting the brush holder 10 and the connector portion 16 are prevented from being externally exposed. As a result, the insulation of the connecting portions 10c and 16b can be secured without complicating the construction of the connecting portions 10c and 16b by applying a special seal or the like to the connecting portions 10c and 16b.

12 Claims, 11 Drawing Sheets

U.S. PATENT DOCUMENTS

| | | |
|---|---|---|
| 6,459,183 B1 * | 10/2002 | Tasch et al. .................. 310/89 |
| 6,573,625 B1 * | 6/2003 | Shimizu et al. ............... 310/71 |
| 6,577,030 B1 * | 6/2003 | Tominaga et al. ........ 310/68 B |
| 6,580,194 B1 * | 6/2003 | Mizutani et al. ............ 310/239 |
| 6,707,188 B1 * | 3/2004 | Torii et al. ................ 310/75 R |
| 6,710,484 B1 * | 3/2004 | Kitoh et al. ................... 310/83 |
| 6,756,711 B1 * | 6/2004 | Matsuyama et al. ...... 310/68 R |
| 6,787,953 B1 * | 9/2004 | Torii ........................... 310/71 |
| 6,992,414 B1 * | 1/2006 | Thomson et al. ............. 310/71 |
| 7,032,290 B1 * | 4/2006 | Hirano et al. ................ 29/596 |
| 2003/0234588 A1 | 12/2003 | Machida ...................... 310/71 |

FOREIGN PATENT DOCUMENTS

| | | |
|---|---|---|
| JP | 5-161301 * | 6/1993 |
| JP | A-H11-146599 | 5/1999 |
| JP | 1 489 725 A1 | 3/2003 |

* cited by examiner

MOTOR AND METHOD FOR MANUFACTURING MOTOR

TECHNICAL FIELD

The present invention relates to a motor, in which a brush holder and a connector portion are integrally provided, and a manufacturing method thereof.

BACKGROUND ART

An example of a motor in which a brush holder and a connector portion are integrally provided is disclosed in Japanese Unexamined Patent Publication No. 2001-218420. This motor is formed by integrally assembling the following elements: a motor body formed by housing an armature having a rotatable shaft and a commutator in a yoke housing; and a speed reducing portion formed by housing a speed reducing mechanism for decelerating the rotation of the rotatable shaft in a gear housing. A brush holder, which holds brushes that are brought into slidable contact with the commutator and supply power, is clamped between the housings. The brush holder has a connector portion integrally molded for receiving power supply from an external source. The brush holder is formed by resin molding.

The shape or direction of insertion of the connector portion or the like differs from purchaser to purchaser of motor. To cope with this, conventionally, a plurality of types of brush holders, different only in connector portion, are manufactured. For this reason, forming dies for molding the entire brush holders including the connector portion must be fabricated with respect to each different constitution of connector portion. This is wasteful.

To cope with this, the following constitution is possible: a connector portion and a brush holder are separated from each other, and a plurality of different types of connector portions are manufactured. Then, the connector portion and the brush holder in accordance with specifications from the purchaser of motor are electrically and mechanically connected together. However, this poses a problem. To secure the insulation of the joint between a brush holder and a connector portion, the construction of the joint is complicated.

The present invention has been made with the above problem taken into account. An object of the present invention is to provide a motor and a manufacturing method thereof wherein a connector portion and a brush holder are separated from each other, and the construction of the joint between the connector portion and the brush holder is simplified and the insulation of the joint is secured without fail.

DISCLOSURE OF THE INVENTION

A motor according to the present invention comprises: a yoke housing that rotatably houses an armature having a rotatable shaft and a commutator; a gear housing that is integrally assembled to the yoke housing and houses a speed reducing mechanism for decelerating the rotation of the rotatable shaft; a brush holder that holds brushes in slidable contact with the commutator; and a connector portion for supplying the brushes with power from an external source. In addition, the brush holder has a holder-side connecting portion, and the connector portion has a connector-side connecting portion for electrical and mechanical connection with the holder-side connecting portion. Both the connecting portions are brought into connected state and clamped between the yoke housing and the gear housing.

As mentioned above, the holder-side connecting portion provided on the brush holder and the connector-side connecting portion provided on the connector portion are electrically and mechanically brought into connected state. When the yoke housing and the gear housing are assembled together, the connecting portions are clamped between both the housings. That is, since the connector portion is separated from the brush holder, the following advantage is brought: even if connector portions are different in constitution (different in shape or direction of insertion or the like), a plurality of different types of connector portions only have to be manufactured in accordance with the differences in constitution. The commonality of brush holders can be provided. For this reason, while a plurality of different types of forming dies are fabricated for molding connector portions, only one type of forming die has to be fabricated for brush holders. As a result, waste can be cut.

As mentioned above, the connecting portions for connection of the brush holder and the connector portion are clamped between the yoke housing and the gear housing. Therefore, the connecting portions are prevented from being externally exposed. As a result, the insulation of the connecting portions can be secured without complicating the construction of the connecting portions by applying a special seal or the like.

In the motor of the above-mentioned constitution, it is preferable that assembly and connection should be carried out as follows: the yoke housing and the gear housing are assembled together in a direction of an axis of the rotatable shaft; and the holder-side connecting portion on the brush holder and the connector-side connecting portion on the connector portion are connected together in a direction, which coincides with a direction of assembly of both the housings. Thereby, the direction of assembly of motor components can be unified, and the assembly of the motor can be facilitated.

The connector portion is preferably provided with a restraining portion for restraining its movement in the direction orthogonal to the rotatable shaft. Thereby, the movement of the connector portion is restrained, and the connecting portions that connect the brush holder and the connector portion can be kept in connected state without fail.

The motor of the above-mentioned constitution is preferably so constructed that the following will be accomplished: the motor has a plurality of fixing portions, which fix the yoke housing to the gear housing, and both the connecting portions are positioned between at least two of the fixing portions. Thereby, the connecting portions are clamped between both the housings with reliability; therefore, the connecting portions can be kept in connected state without fail.

Further, the motor is preferably so constructed that the following will be accomplished: the brush holder has holder-side connecting terminals, and the connector portion has connector-side connecting terminals for electrical connection with the holder-side connecting terminal. Concurrently with mechanical connection of both the connecting portions, the holder-side connecting terminal and the connector-side connecting terminal are connected with each other and both the connecting portions are electrically connected with each other. Thereby, the connecting portions can be electrically and mechanically connected at a time, and the connecting operation can be facilitated.

Further, it is preferable that at least one of the brush holder and the connector portion has a sealing member that seals between the yoke housing and the gear housing. Thereby, the area between the housings can be sealed with reliability, and the connecting portions, which connect the brush holder and the connector portion, can be more positively insulated. In addition, the area between the housings can be sealed only by assembling both the housings with predetermined portions of the brush holder and the connector portion clamped therebetween. Therefore, when both the housings are assembled together, the operation of separately assembling a sealing member is not required.

The connector portion may include a control portion, which is integrally provided in the connector portion and controls rotation of the motor. If the connector portion is integrally provided with the control portion, the same action and effect as described above can be obtained.

The connector portion preferably has a first engaging portion. The gear housing preferably has a second engaging portion, which is engaged with the first engaging portion in a direction of connecting the holder-side connecting portion with the connector-side connecting portion. With the connector portion engaged with the gear housing, thereby, both the connecting portions of the connector portion and the brush holder can be connected together.

A manufacturing method for motors according to the present invention is a manufacturing method for a motor comprising: a yoke housing that rotatably houses an armature having a rotatable shaft and a commutator; a gear housing that is integrally assembled to the yoke housing and houses a speed reducing mechanism for decelerating the rotation of the rotatable shaft; a brush holder that holds brushes in slidable contact with the commutator and has a holder-side connecting portion; and a connector portion that has a connector-side connecting portion for electrical and mechanical connection with the holder-side connecting portion and is for supplying the brushes with power from an external source. In addition, the connector portion is provided with a first engaging portion, and the gear housing is provided with a second engaging portion. The second engaging portion is to be engaged with the first engaging portion in the direction of connecting the holder-side connecting portion with the connector-side connecting portion. In the manufacturing method, the first engaging portion of the connector portion is engaged with the second engaging portion of the gear housing; with the connector portion thus engaged with the gear housing, the holder-side connecting portion and the connector-side connecting portion are connected together; and both the connecting portions in connected state are clamped between the yoke housing and the gear housing.

That is, with the connector portion engaged with the gear housing, both the connecting portions of the connector portion and the brush holder are connected together. If both the connecting portions of the connector portion and the brush holder are connected together beforehand and they are assembled to the gear housing, a problem arises. The connector portion can drop off from the brush holder or the connecting portions can become misaligned and erroneous assembly can result. However, the problem of possible erroneous assembly can be solved by connecting both the connecting portions of the connector portion and the brush holder with the connector portion engaged with the gear housing, as mentioned above. The components are assembled together based on the gear housing, and the present invention is suitable for automatic assembly of a motor.

Other features and excellent effects of the present invention will be apparent from the following description of embodiments taken in connection with the accompanying drawings.

BRIEF DESCRIPTION OF DRAWINGS

FIGS. 2A and 2B are sectional views of the brush holder and the connector portion in the first embodiment. FIG. 2A illustrates their state after assembly, and FIG. 2B illustrates their state before assembly.

FIGS. 4A and 4B are sectional views illustrating a brush holder and a connector portion in a second embodiment. FIG. 4A illustrates their state after assembly, and FIG. 4B illustrates their state before assembly.

FIGS. 7A and 7B are sectional views illustrating the brush holder and the connector portion in the fourth embodiment. FIG. 7A illustrates their state after assembly, and FIG. 7B illustrates their state before assembly.

FIGS. 8A and 8B are sectional views illustrating a brush holder and a connector portion in a fifth embodiment. FIG. 8A illustrates their state after assembly, and FIG. 8B illustrates their state before assembly.

FIGS. 9A and 9B are sectional views illustrating a brush holder and a connector portion in a sixth embodiment. FIG. 9A illustrates their state after assembly, and FIG. 9B illustrates their state before assembly.

FIGS. 10A and 10B are sectional views illustrating a brush holder and a connector portion in a seventh embodiment. FIG. 10A illustrates their state after assembly, and FIG. 10B illustrates their state before assembly.

FIGS. 11A and 11B are sectional views illustrating a brush holder and a connector portion in an eighth embodiment. FIG. 11A illustrates their state after assembly, and FIG. 11B illustrates their state before assembly.

BEST MODE FOR CARRYING OUT THE INVENTION

Hereafter, description will be given to a first embodiment in which the present invention is realized with reference to drawings.

Figure 1:
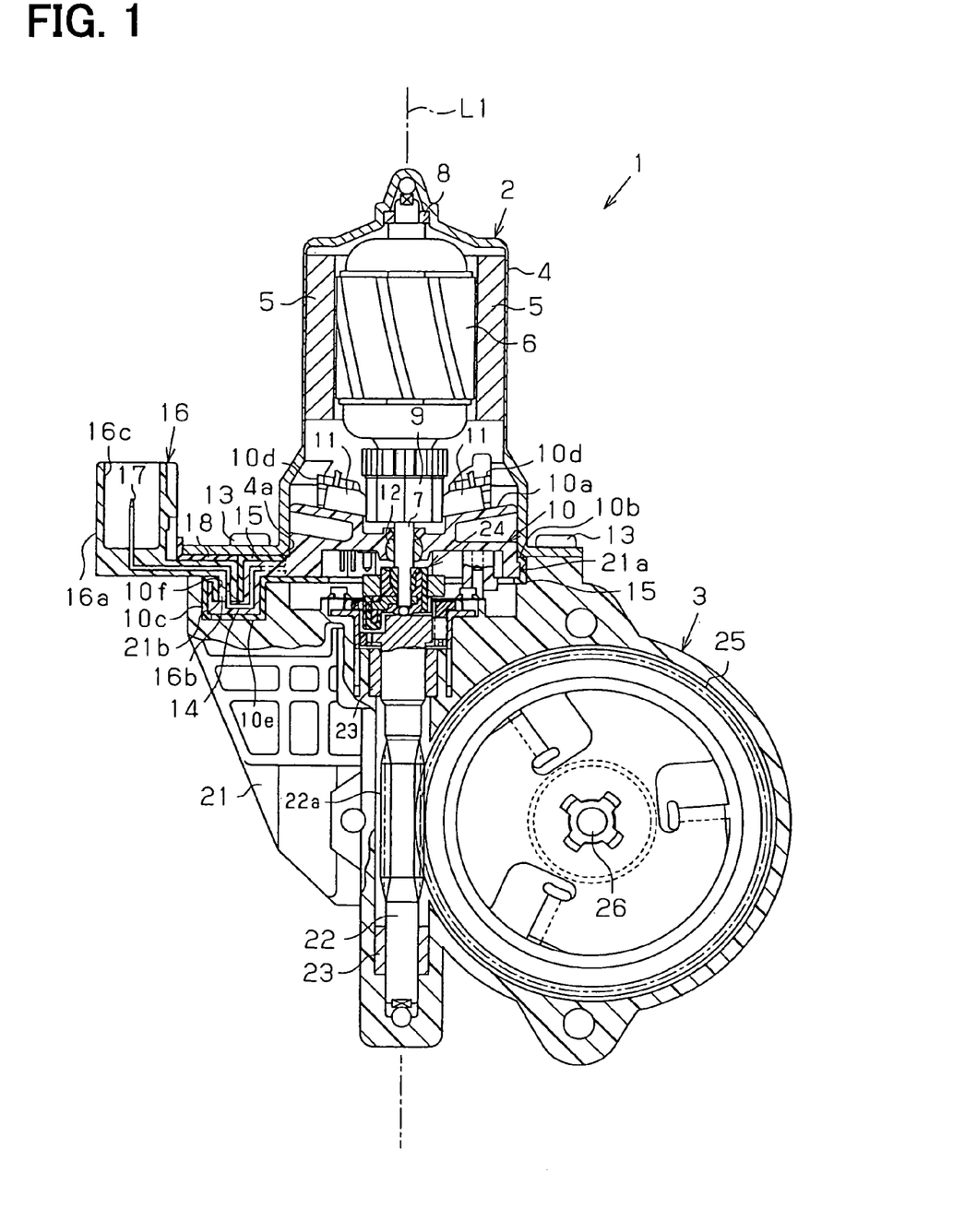
FIG. 1 is a sectional view of a motor of a first embodiment.

FIG. 1 illustrates a motor 1 in this embodiment. The motor 1 in this embodiment is used as a driving source for a power window device for vehicles. The motor 1 is formed by integrally assembling together a motor body 2 and a speed reducing portion 3 that decelerates the rotation of the motor body 2.

The motor body 2 has a yoke housing 4 in the shape of closed-end squashy cylinder. A plurality of magnets 5 are fixed to the inside surface of the yoke housing 4 in predetermined positions. An armature 6 is rotatably housed inside the magnets 5. More specific description will be given. The armature 6 has a rotatable shaft 7, and the basal portion of the rotatable shaft 7 is rotatably supported in a bearing 8 installed at the bottom of the yoke housing 4. A commutator 9 is fixed on the tip portion side of the rotatable shaft 7. The yoke housing 4 is assembled to the gear housing 21 of the speed reducing portion 3 in a direction of the axis L1 of the rotatable shaft 7. The yoke housing 4 is secured by three screws 13 (only two are shown in FIG. 1) that constitute fixing portions.

Figure 2A:
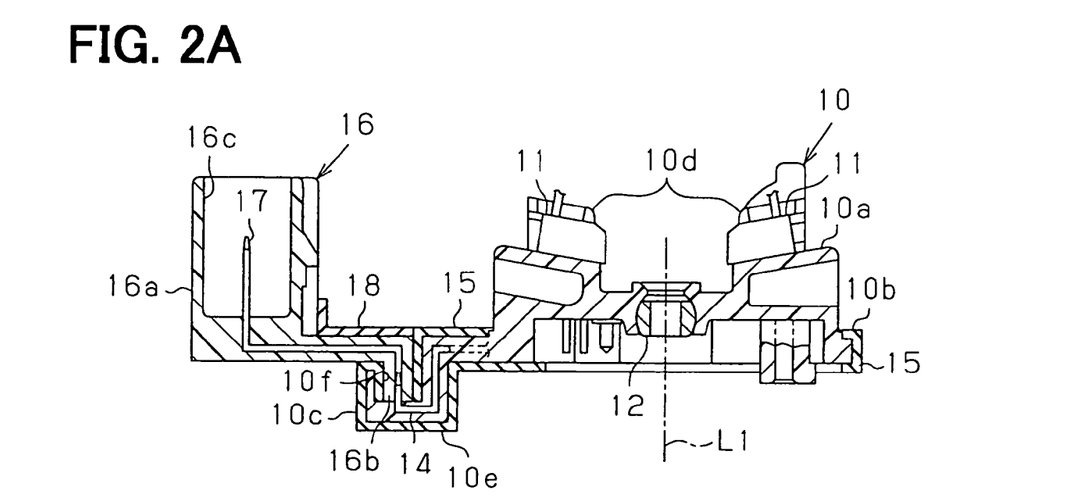
Figure 2B:
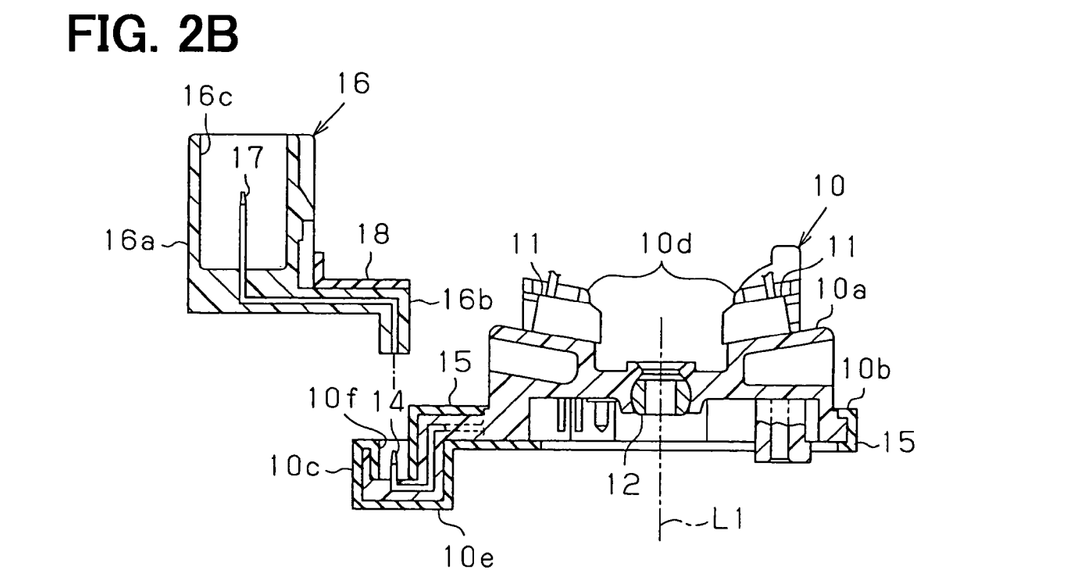
Figure 3:
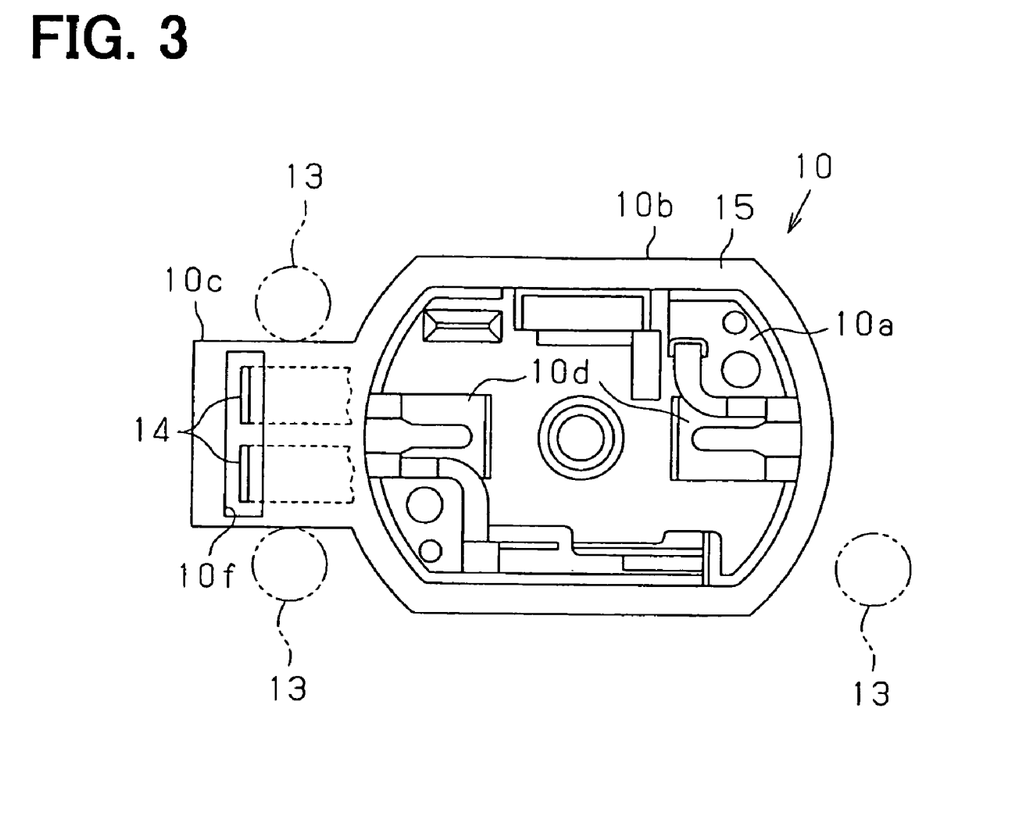
FIG. 3 is a plan view illustrating the brush holder in the first embodiment.

A brush holder 10 is clamped between the opening 4a of the yoke housing 4 and the opening 21a of the gear housing 21. When both the housings 4 and 21 are secured with the screws 13, the brush holder 10 is secured between the housings 4 and 21. As illustrated in FIGS. 2A and 2B and FIG. 3, the brush holder 10 comprises a holder body 10a, a clamping portion 10b, and a holder-side connecting portion 10c.

The holder body 10a is fit into the opening 4a of the yoke housing 4 in the direction of the axis L1 of the rotatable shaft 7. A pair of brushes 11 that are in slidable contact with the commutator 9 are held by the holder body 10a at its brush holding portion 10d. A bearing 12 is held in the center of the holder body 10a. The bearing 12 rotatably supports the tip portion side of the rotatable shaft 7.

The clamping portion 10b is extended from the holder body 10a like a flange, and is clamped between the openings 4a and 21a of the housings 4 and 21.

The holder-side connecting portion 10c is protruded from the holder body 10a outward in the radial direction, and is clamped together with the clamping portion 10b between the openings 4a and 21a of the housings 4 and 21. The holder-side connecting portion 10c is provided for electrical and mechanical connection with a connector portion 16 described later.

In the holder-side connecting portion 10c, a fitting bulge 10e and a coupling recess 10f are formed. The fitting bulge 10e that is protruded toward the speed reducing portion 3 in the direction of the axis L1 of the rotatable shaft 7. (The fitting bulge is protruded downward in FIGS. 2A and 2B.) The coupling recess 10f is open toward the motor body 2 in the direction of the axis L1 of the rotatable shaft 7 at the fitting bulge 10e. (The coupling recess 10f is open upward in FIGS. 2A and 2B.) In the coupling recess 10f, the tip portions of holder-side terminals 14 as holder-side connecting terminals are exposed. The tip portions of the holder-side terminals 14 are in male configuration. The holder-side terminals 14 are insert molded on the holder-side connecting portion 10c and the holder body 10a, and are electrically connected with the brushes 11 on the holder body 10a side. In FIG. 1 and FIGS. 2A and 2B, the terminals 14 positioned in the holder body 10a are not omitted.

A sealing member 15 composed of such an elastic material as elastomer is integrally formed on the portions of the holder-side connecting portion 10c, excepting the area where the terminals 14 are exposed, and the clamping portion 10b. The sealing member 15 is clamped between the openings 4a and 21a of the housings 4 and 21, and thereby seals the openings 4a and 21a.

The connector portion 16 comprises a connector body 16a and a connector-side connecting portion 16b that constitutes a restraining portion. The connector body 16a is exposed to outside both the housings 4 and 21, and is coupled with a vehicle body-side connector (now shown) to supply power from the vehicle body side and for other purposes. The connector body 16a is so constructed that the vehicle body-side connector will be inserted thereinto from the motor body 2 side in the direction of the axis L1 of the rotatable shaft 7. The connector body 16a has a recess 16c that is open toward the motor body 2 in the direction of the axis L1. In the recess 16c, the tips of connector-side terminals 17 as connector-side connecting terminals are exposed.

The connector-side terminals 17 are insert molded in the connector body 16 and the connector-side connecting portion 16b.

The connector-side connecting portion 16b is in such a shape that it is bent substantially at 90° C. from the connector body 16a. The connector-side connecting portion 16b is clamped together with the holder-side connecting portion 10c and the clamping portion 10b between the openings 4a and 21a of the housings 4 and 21. The tip portion of the connector-side connecting portion 16b is directed toward the direction opposite the direction of opening of the recess 16c. The tip portion is inserted into the coupling recess 10f provided in the holder-side connecting portion 10c in the direction of the axis L1 of the rotatable shaft 7. As a result, the connector-side connecting portion 16b and the holder-side connecting portion 10c are coupled with each other. That is, the connector portion 16 is restrained from moving in the direction of the radius of the motor 1 (the direction orthogonal to the rotatable shaft 7) by this coupling.

At the tip portion of the connector-side connecting portion 16, the basal portions of the connector-side terminals 17 are positioned. The basal portions of the connector-side terminals 17 are in female configuration. When the connector-side connecting portion 16b and the coupling recess 10f of the holder-side connecting portion 10c are coupled (mechanically connected) with each other, the following simultaneously takes place: the basal portions of the connector-side terminals 17 and the tip portions of the holder-side terminals 14 are connected (electrically connected) with each other.

A sealing member 18 similar with the sealing member 15 of the brush holder 10 is integrally molded on the connector-side connecting portion 16b. The sealing member 18 is clamped together with the sealing member 15 between the openings 4a and 21a of the housings 4 and 21, and thereby seals the openings 4a and 21a. The openings 4a and 21a of the housings 4 and 21 are sealed with these sealing members 15 and 18, and the insulation of the joint between the terminals 14 and 17 can be secured without fail.

As mentioned above, electrically and mechanically connected with the brush holder 10, the connector portion 16 is placed between the openings 4a and 21a of the housings 4 and 21. Both the housings 4 and 21 are secured with the three screws 13, and thereby the connector portion 16 and the brush holder 10 in connected state are secured between the housings 4 and 21. As illustrated in FIG. 3, the holder-side connecting portion 10c with which the connector portion 16 (connector-side connecting portion 16b) is coupled is positioned between two of the screws 13, which serve as the fixing portions. Thereby, electrical and mechanical connection can be maintained between the connector-side connecting portion 16b and the holder-side connecting portion 10c with reliability.

The speed reducing portion 3 includes the gear housing 21 of resin. In the opening 21a of the gear housing 21, a fitting recess 21b is formed for fitting the fitting bulge 10e of the brush holder 10 thereinto in the direction of the axis L1 of the rotatable shaft 7. In the gear housing 21, a worm shaft 22 that is integrally provided with a worm 22a and constitutes the speed reducing mechanism is rotatably supported in a pair of bearings 23 installed in the housing 21. The worm shaft 22 is coupled with the rotatable shaft 7 of the motor body 2 through a clutch 24. The clutch 24 operates to transmit the torque of the rotatable shaft 7 to the worm shaft 22 and to prevent the torque from the worm shaft 22 from being transmitted to the rotatable shaft 7.

Further, in the gear housing 21, a worm wheel 25 that constitutes the speed reducing mechanism is rotatably supported. The worm wheel 25 is engaged with the worm 22a of the worm shaft 22. An output shaft 26 is coupled with the center of the worm wheel 25 so that the output shaft will be rotated integrally with the worm wheel 25. When the motor body 2 is driven, the rotatable shaft 7 is rotated, and its rotation is transmitted to the worm shaft 22 through the clutch 24. The rotation of the worm shaft 22 is transmitted to the output shaft 26 through the worm wheel 25 to open or close window glass.

Next, description will be given below to the action and effect characteristic of the motor 1 of this embodiment constructed as mentioned above.

(1) The holder-side connecting portion 10c provided on the brush holder 10 and the connector-side connecting portion 16b provided on the connector portion 16 are electrically and mechanically brought into connected state. When the yoke housing 4 and the gear housing 21 are assembled together, the holder-side connecting portion 10c and the connector-side connecting portion 16b are clamped between the housings 4 and 21. That is, since the connector portion 16 is separated from the brush holder 10, the following advantage is brought: even if connector portions 16 are different in constitution (different in shape or direction of insertion or the like), a plurality of different types of connector portions 16 only have to be manufactured in accordance with the differences in constitution. The commonality of the brush holder 10 can be provided. For this reason, while a plurality of different types of forming dies are fabricated for molding connector portions 16, only one type of forming die has to be fabricated for brush holders 10. As a result, waste can be cut. As mentioned above, the connecting portions 10c and 16b for connection of the brush holder 10 and the connector portion 16 are clamped between the yoke housing 4 and the gear housing 21. Therefore, the connecting portions 10c and 16b are prevented from being externally exposed. As a result, the insulation of the connecting portions 10c and 16b can be secured without complicating the construction of the connecting portions 10c and 16b by applying a special seal or the like to the connecting portions 10c and 16b.

(2) The holder-side connecting portion 10c of the brush holder 10 and the connector-side connecting portion 16b of the connector portion 16 are connected together along the direction of assembly of the yoke housing 4 and the gear housing 21 (the direction of the axis L1 of the rotatable shaft 7). Thereby, the direction of assembly of the components of the motor 1 can be unified, and the assemblability of the motor 1 can be enhanced.

(3) The connector portion 16 is restrained from moving in the direction orthogonal to the rotatable shaft 7 by fitting the connector-side connecting portion 16b into the coupling recess 10f of the brush holder 10. Thereby, the movement of the connector portion 16 is restrained, and the connecting portions 10c and 16b that connect the brush holder 10 and the connector portion 16 can be kept in connected state without fail.

(4) The connecting portions 10c and 16b that connect the brush holder 10 and the connector portion 16 are so provided that the following takes place: the connecting portions 10c and 16b are positioned between the two screws 13 (fixing portions) of the three screws 13 for fixing the yoke housing 4 to the gear housing 21. Thereby, the connecting portions 10c and 16b are clamped between both the housings 4 and 21 with reliability; therefore, the connecting portions 10c and 16b can be kept in connected state without fail.

(5) Concurrently with mechanical connection of the connecting portions 10c and 16b of the brush holder 10 and the connector portion 16, the holder-side terminals 14 and the connector-side terminals 17 are connected together. Thereby, the connecting portions 10c and 16b are electrically connected together. Thus, the connecting portions 10c and 16b are electrically and mechanically connected at a time, and the connecting operation can be facilitated.

(6) The brush holder 10 and the connector portion 16 are provided at their predetermined portions with the sealing members 15 and 18 for sealing the area between the yoke housing 4 and the gear housing 21. (The predetermined portions include the clamping portion 10b, holder-side connecting portion 10c, and connector-side connecting portion 16b.) Thereby, the area between the housings 4 and 21 can be sealed with reliability, and the connecting portions 10c and 16b, which connect the brush holder 10 and the connector portion 16, can be more positively insulated. The area between the housings 4 and 21 can be sealed only by assembling the housings 4 and 21 with predetermined portions of the brush holder 10 and the connector portion 16 clamped therebetween. (The predetermined portions include the clamping portion 10b, holder-side connecting portion 10c, and connector-side connecting portion 16b.) Therefore, when both the housings 4 and 21 are assembled together, the operation of separately assembling a sealing member is not required.

Embodiments of the present invention may be modified as follows:

The constitutions of the brush holder 10 and the connector portion 16 are not limited to the above-mentioned embodiment, and may be modified as appropriate. For example, the constitutions may be modified as illustrated in FIGS. 4A and 4B to FIGS. 11A and 11B.

Figure 4A:
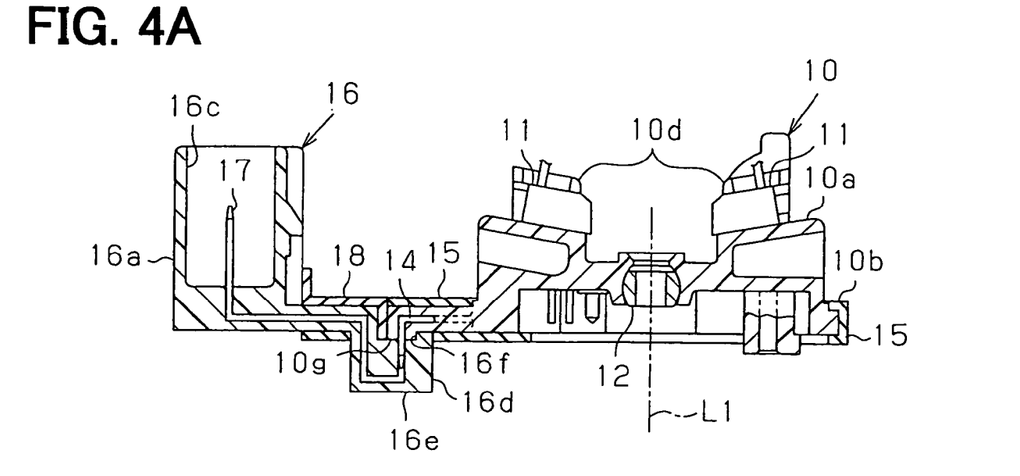
Figure 4B:
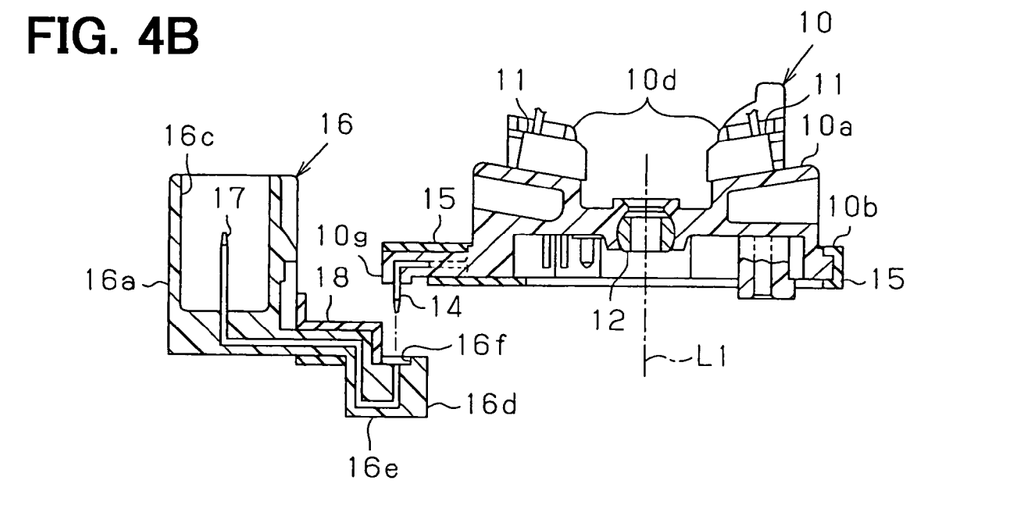

In a second embodiment illustrated in FIGS. 4A and 4B, the connector-side connecting portion 16d is formed on the connector portion 16. The connector-side connecting portion 16d has a fitting bulge 16e and a coupling recess 16f as restraining portions for fitting into the fitting recess 21b of the gear housing 21. Meanwhile, a holder-side connecting portion 10g is formed on the brush holder 10. The holder-side connecting portion 10g is fitted into the coupling recess 16f in the direction of the axis L1 of the rotatable shaft 7 for electrical and mechanical connection with the connector-side connecting portion 16d. That is, the construction of the first embodiment mentioned above may be inverted with respect to the convex-concave relation. In this case, the connector portion 16 is retrained from moving in the direction of the radius of the motor 1 (the direction orthogonal to the rotatable shaft 7) by the following: the fitting bulge 16e is fitted into the fitting recess 21b of the gear housing 21, and the coupling recess 16f is fitted onto the holder-side connecting portion 10g. This constitution also brings about the same effect as the first embodiment mentioned above.

Figure 5A:
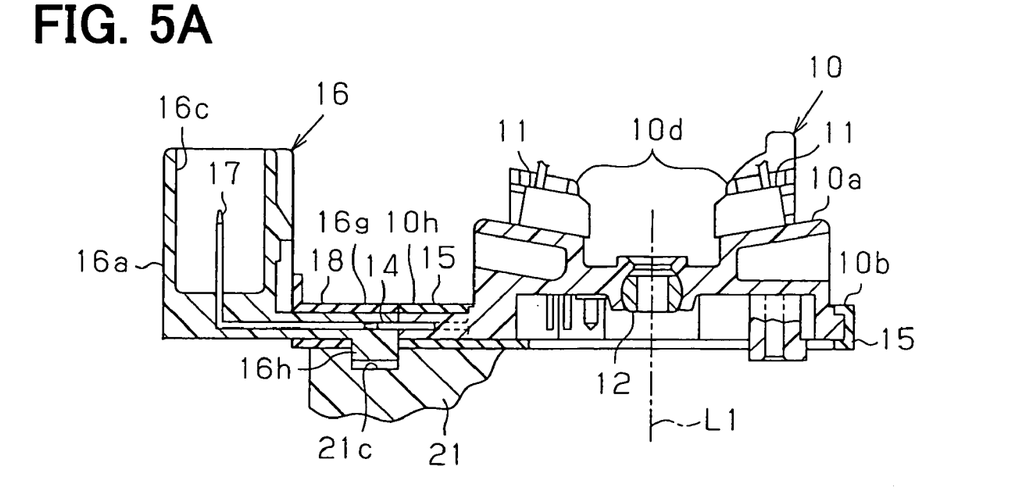
FIGS. 5A and 5B are sectional views illustrating a brush holder and a connector portion in a third embodiment.
Figure 5B:
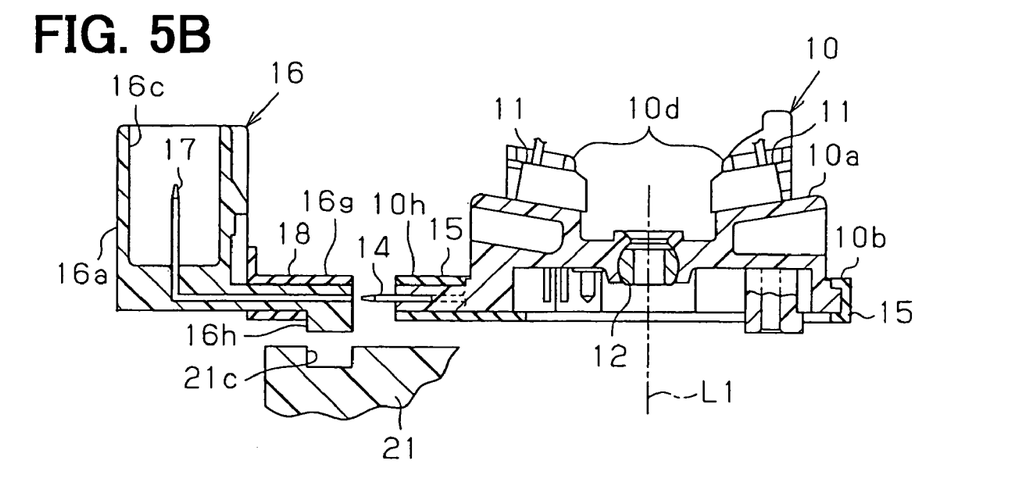

In a third embodiment illustrated in FIGS. 5A and 5B, the holder-side connecting portion 10h of the brush holder 10 and the connector-side connecting portion 16g of the connector portion 16 are electrically and mechanically connected. This connection is carried out in the direction orthogonal to the direction of the axis L1 of the rotatable shaft 7. Further, a fitting bulge 16h as a restraining portion, to be fitted into the fitting recess 21c of the gear housing 21, is formed on the connector-side connecting portion 16g. This fitting bulge 16h is fitted into the fitting recess 21c of the gear housing 21, and thereby the connector portion 16 is restrained from moving in the direction of the radius of the motor 1 (direction orthogonal to the rotatable shaft 7). This constitution also brings about the same effect as the fist embodiment mentioned above.

Figure 6:
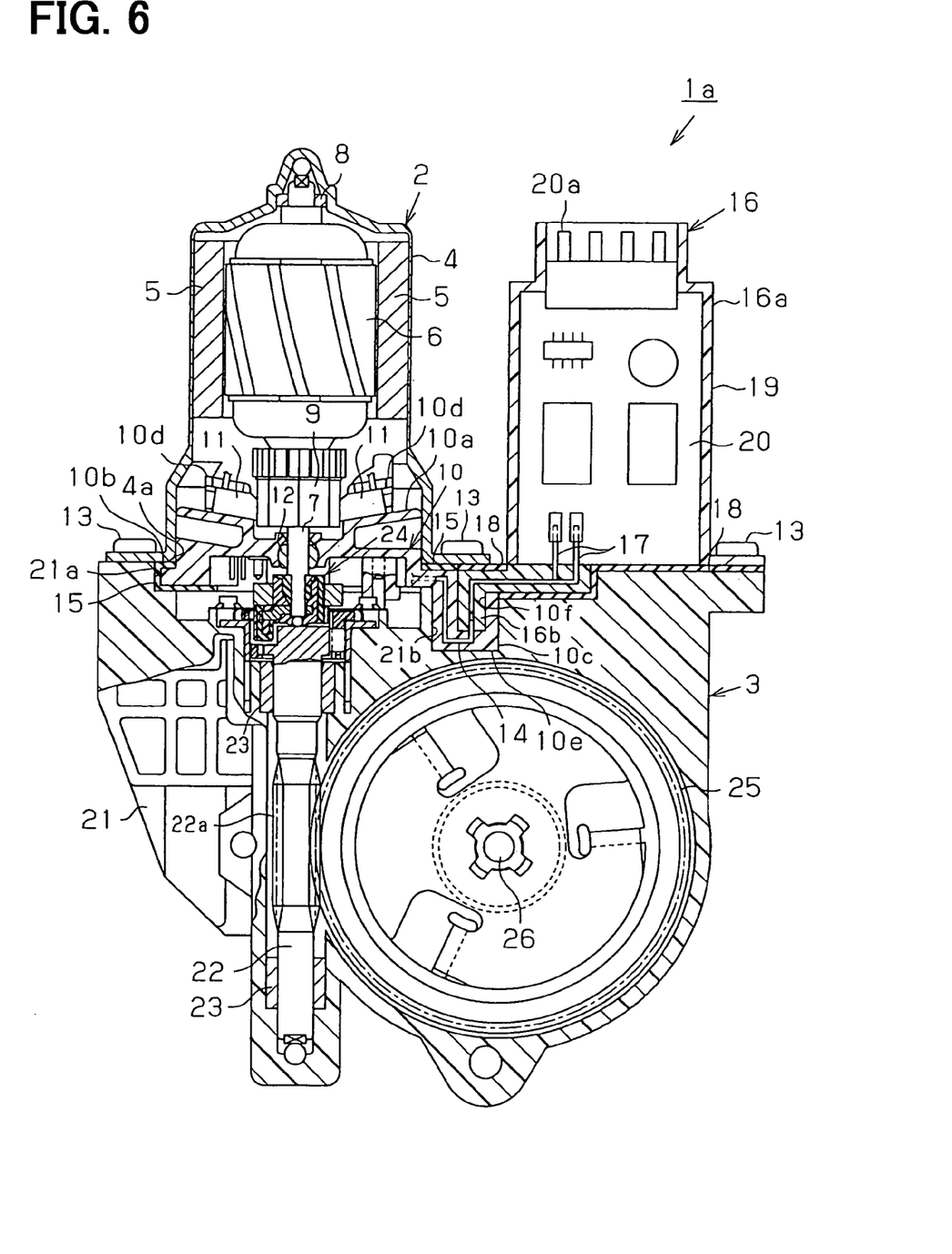
FIG. 6 is a sectional view of a motor of a fourth embodiment.
Figure 7A:
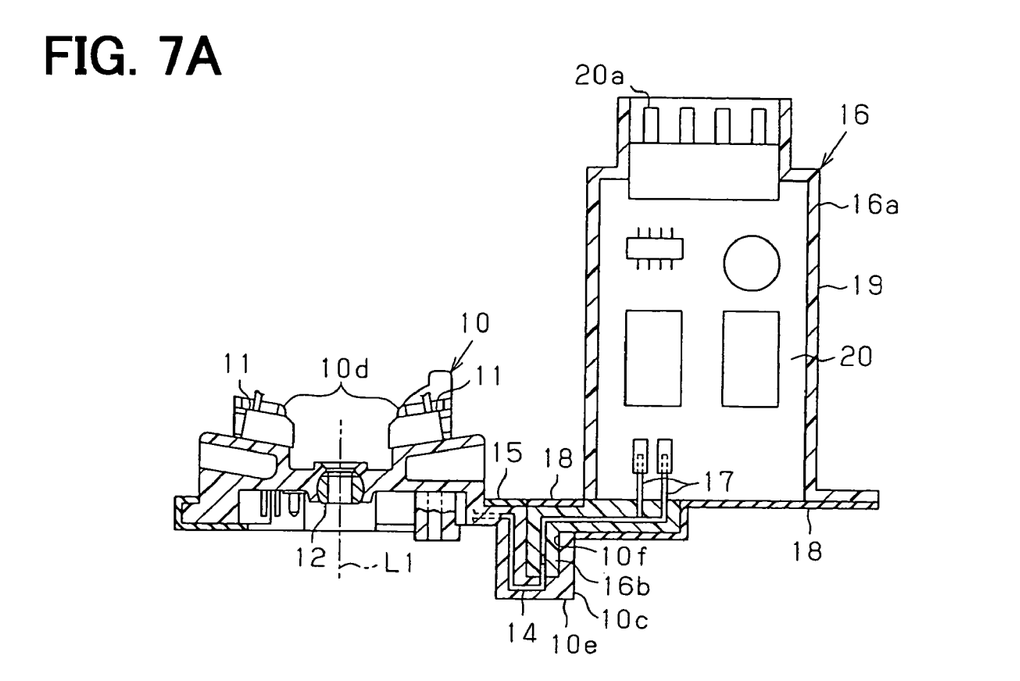
Figure 7B:
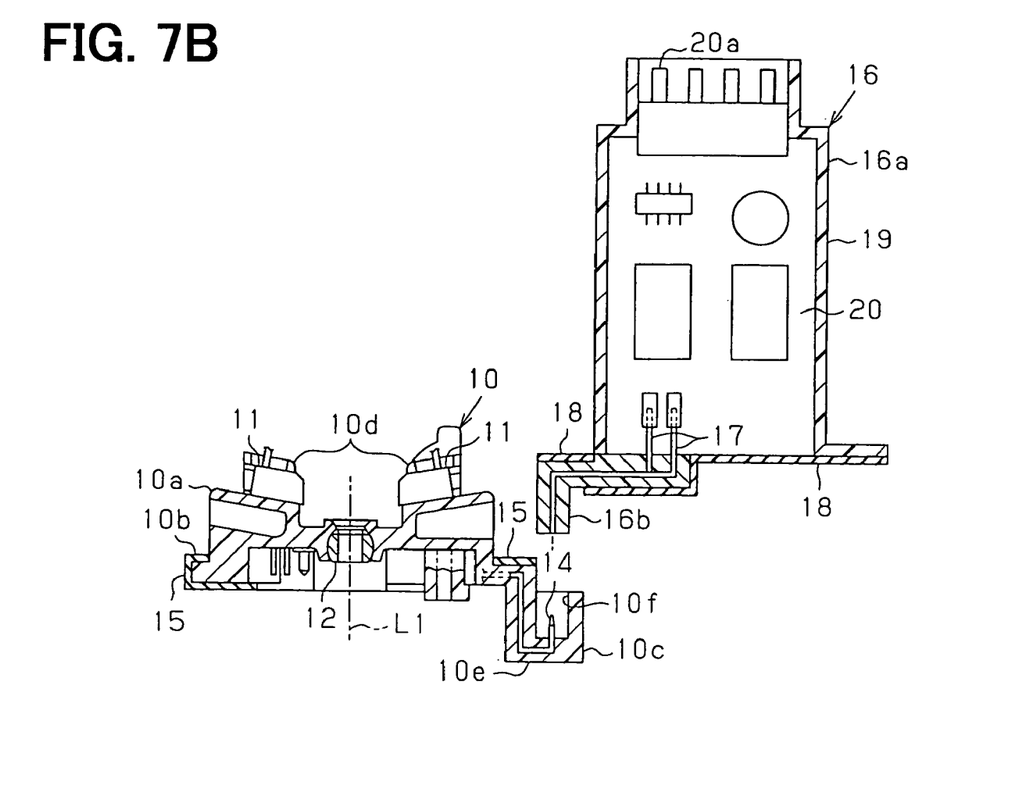

As in the first embodiment mentioned above, a motor $1a$ of a fourth embodiment, illustrated in FIG. 6 and FIGS. 7A and 7B, has the following: the motor $1a$ has the holder-side connecting portion $10c$ in the brush holder 10 and the connector-side connecting portion $16b$ in the connector portion 16. The connector body $16a$ of the connector portion 16 is integrally provided with a control portion 19 that controls the rotation of the motor 1 (motor body 2). The control portion 19 has a control circuit board 20, and this control circuit board 20 is housed in the case of the connector body $16a$. The control circuit board 20 is electrically connected with the connector-side terminals 17, and is provided with terminals $20a$ for external connection for connection with a vehicle body-side connector (not shown). If the connector portion 16 is integrally provided with the control portion 19 as mentioned above, the same effect as in the first embodiment mentioned above can be obtained.

Figure 8A:
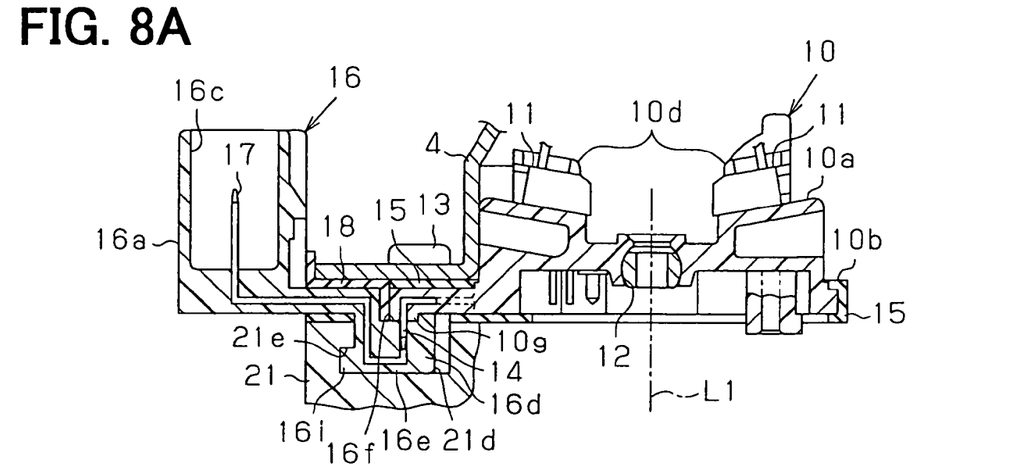
Figure 8B:
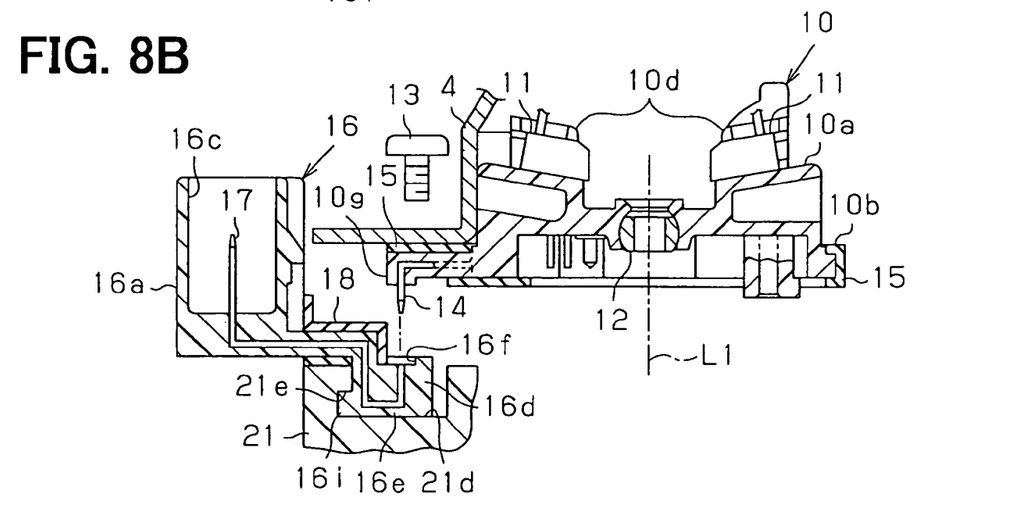

A fifth embodiment illustrated in FIGS. 8A and 8B is a modification to the second embodiment illustrated in FIGS. 4A and 4B. More specific description will be given. An engaging bulge $16i$ as a first engaging portion is formed on the fitting bulge $16e$ of the connector portion 16. This engaging bulge $16i$ is provided so that it is extended outward in the radial direction from the lower end of the outside surface (the surface on the side opposite the brush holder 10) of the fitting bulge $16e$ in the direction of the radius of the motor 1. In the gear housing 21, meanwhile, a housing recess $21d$ is formed whose size is large enough to insert the fitting bulge $16e$ including the engaging bulge $16i$ in the direction of the axis L1.

An engaging recess $21e$ as a second engaging portion is formed in the housing recess $21d$ in correspondence with the engaging bulge $16i$ of the connector portion 16. That is, the engaging recess $21e$ is provided so that it is directed outward in the radial direction at the lower end of the inside surface of the housing recess $21d$ located on the outer side in the direction of the radius of the motor 1. The engaging bulge $16i$ is fitted into the engaging recess $21e$ from the radial direction, and the engaging bulge $16i$ is engaged with the engaging recess $21e$ in the direction of the axis L1. That is, the connector portion 16 is engaged with the gear housing 21 in the direction of the axis L1, or the direction of connection of the holder-side connecting portion $10g$ and the connector-side connecting portion $16d$. As a result, the connector portion 16 is restrained from moving in the direction of the axis L1. In this embodiment, as mentioned above, the connector portion 16 is attached to the gear housing 21, and thereafter the motor body 2 with the brush holder 10 attached thereto is assembled to the gear housing 21. As a result, the holder-side connecting portion $10g$ and the connector-side connecting portion $16d$ are connected with each other. Even if this modification is carried out, the same effect as in the first and second embodiments mentioned above can be obtained.

In this embodiment, as mentioned above, the engaging bulge $16i$ of the connector portion 16 is fitted into the engaging recess $21e$ provided in the gear housing 21 in the direction of the axis L1. With the connector portion 16 engaged with the gear housing 21, the holder-side connecting portion $10g$ and the connector-side connecting portion $16d$ are connected with each other. At the same time, both the connecting portions $10g$ and $16d$ are clamped between the yoke housing 4 and the gear housing 21. That is, with the connector portion 16 engaged with the gear housing 21, the connecting portions $10g$ and $16d$ of the connector portion 16 and the brush holder 10 are connected with each other. If the connecting portions $10g$ and $16d$ of the connector portion 16 and the brush holder 10 are connected together beforehand and they are assembled to the gear housing 21, a problem arises. The connector portion 16 can drop off from the brush holder 10 or the connecting portions $10g$ and $16d$ can become misaligned and erroneous assembly can result. However, the problem of possible erroneous assembly can be solved by taking the following measure: with the connector portion 16 engaged with the gear housing 21, as mentioned above, the connecting portions $10g$ and $16d$ of the connector portion 16 and the brush holder 10 are connected with each other. The components are assembled together based on the gear housing 21, and the present invention is suitable for automatic assembly of the motor 1.

Figure 9A:
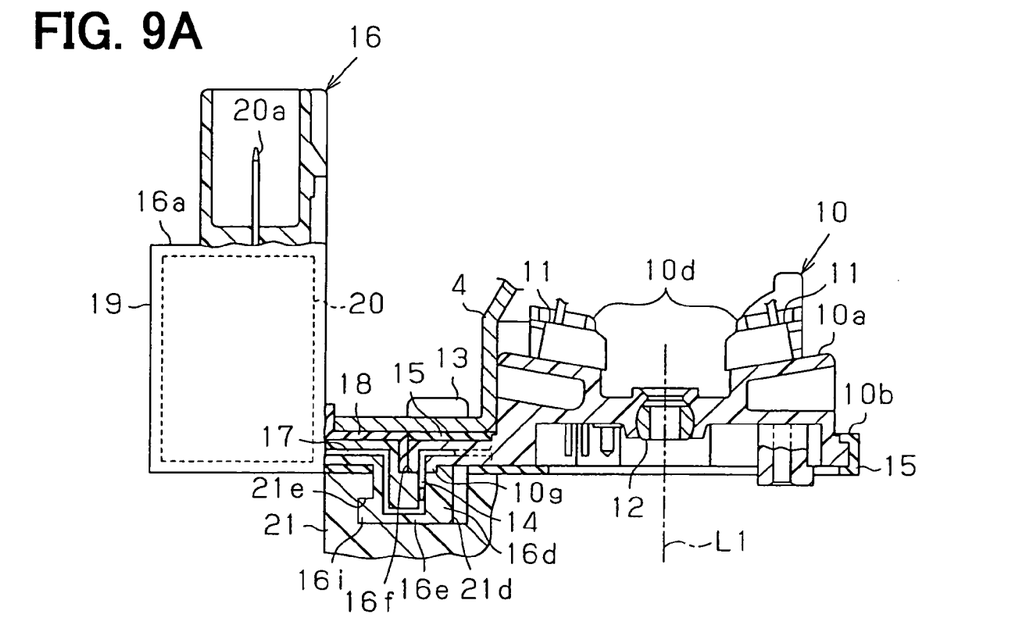
Figure 9B:
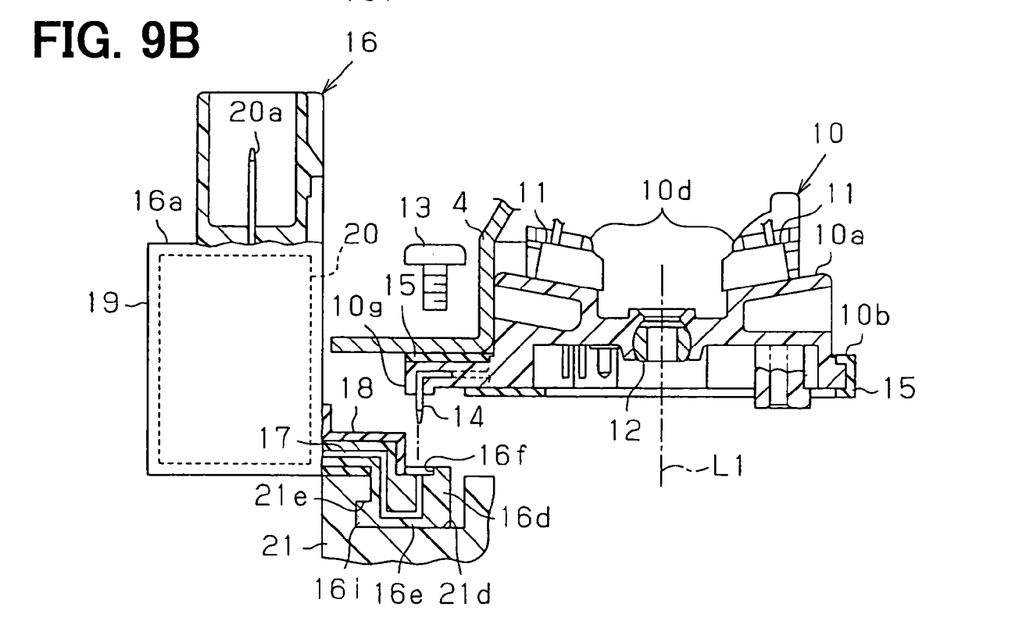

A sixth embodiment illustrated in FIGS. 9A and 9B is a modification to the fifth embodiment illustrated in FIGS. 8A and 8B. More specific description will be given. The connector body $16a$ of the connector portion 16 is integrally provided with a control portion 19 that controls the rotation of the motor 1 (motor body 2). The control portion 19 has a control circuit board 20, and this control circuit board 20 is housed in the case of the connector body $16a$. The control circuit board 20 is electrically connected with the connector-side terminals 17, and is provided with terminals $20a$ for external connection for connection with a vehicle body-side connector (not shown). If this modification is carried out, the same effect as in the first, second, and fifth embodiments mentioned above can be obtained.

Figure 10A:
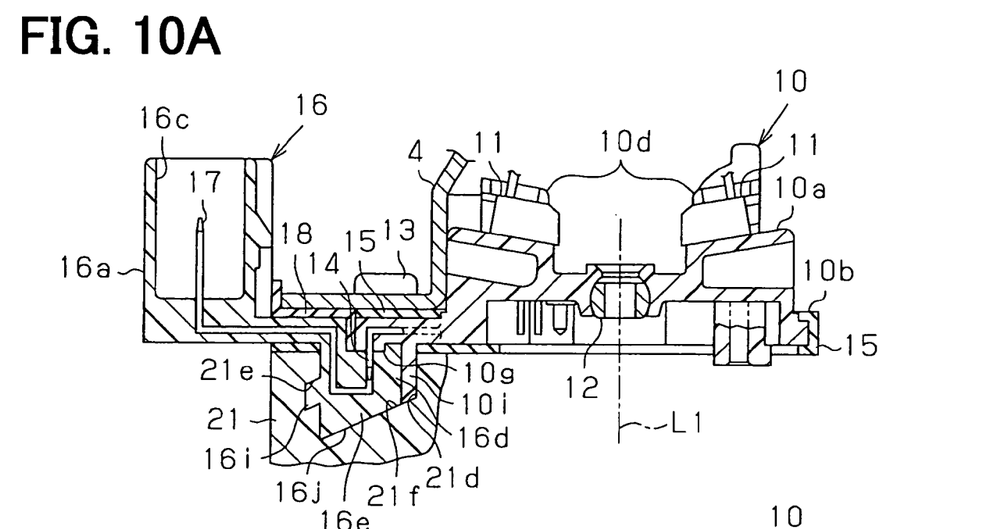
Figure 10B:
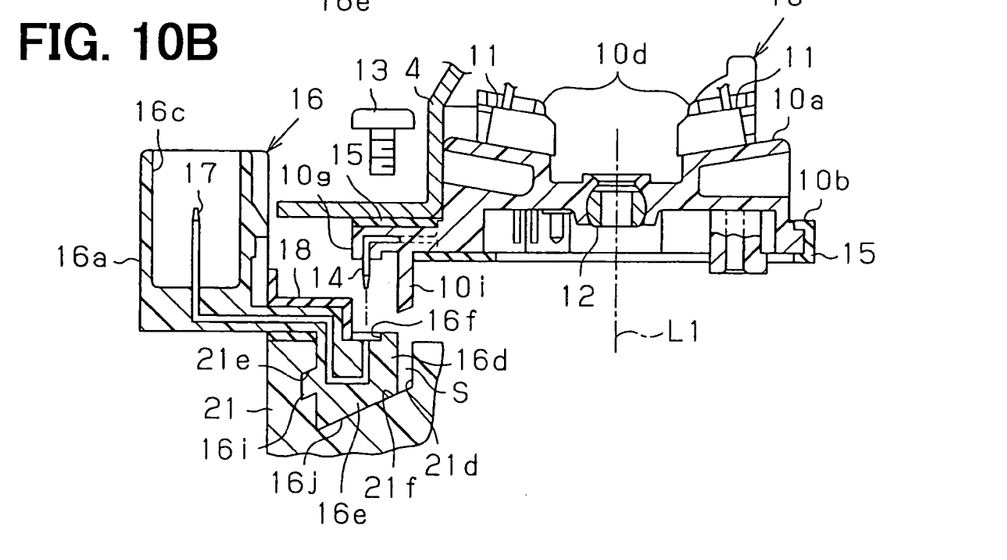

A seventh embodiment illustrated in FIGS. 10A and 10B is a modification to the fifth embodiment illustrated in FIGS. 8A and 8B. More specific description will be given. The lower end of the fitting bulge $16e$ of the connector portion 16 is constituted as a tapered face $16j$. That is, the lower end is protruded downward as it goes outward in the direction of the radius of the motor 1 (it goes away from the brush holder 10). Correspondingly, the bottom face of the housing recess $21d$ of the gear housing 21 is constituted as a tapered face $21f$ that is recessed downward as it goes outward in the direction of the radius of the motor 1. The engaging bulge $16i$ and the engaging recess $21e$ are so set that their directions of projection and recess will be parallel with these tapered faces $16j$ ad $21f$. More specific description will be given. When the fitting bulge $16e$ of the connector portion 16 is inserted into the housing recess $21d$ in the direction of the axis L1, the tapered faces $16j$ and $21f$ are abutted against each other. As a result, the connector portion 16 is also radially moved along the tapered face $21f$, and the engaging bulge $16i$ is fitted into the engaging recess $21e$. Thus, the engaging recess $21e$ and the engaging bulge $16i$ are engaged with each other, and thereby the connector portion 16 is engaged with the gear housing 21 in the direction of the axis L1. As a result, the connector portion 16 is restrained from moving in this direction. If this modification is carried out, the same effect as in the first, second, and fifth embodiments can be obtained. With this constitution, attachment of the connector portion 16 to the gear housing 21 is facilitated.

This embodiment is so constituted that the following takes place after the connector portion 16 is attached to the gear housing 21: when the motor body 2 with the brush holder 10 attached thereto is assembled to the gear housing 21, an inserting bulge $10i$ erected from the brush holder 16 is fitted into the air space S formed between the fitting bulge $16e$ and the housing recess $21d$. That is, this embodiment is so constructed that the inserting bulge $10i$ is fitted into the air space S, and thereby the fitting bulge $16e$ is prevented from rattling in the housing recess 21d. As a result, stress on the holder-side terminals 14 that is otherwise produced by this rattling is reduced.

Figure 11A:
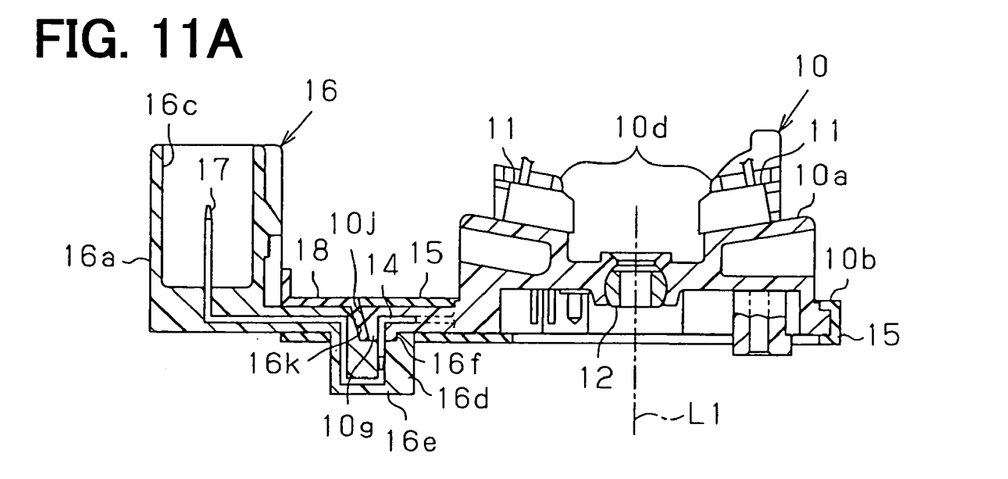
Figure 11B:
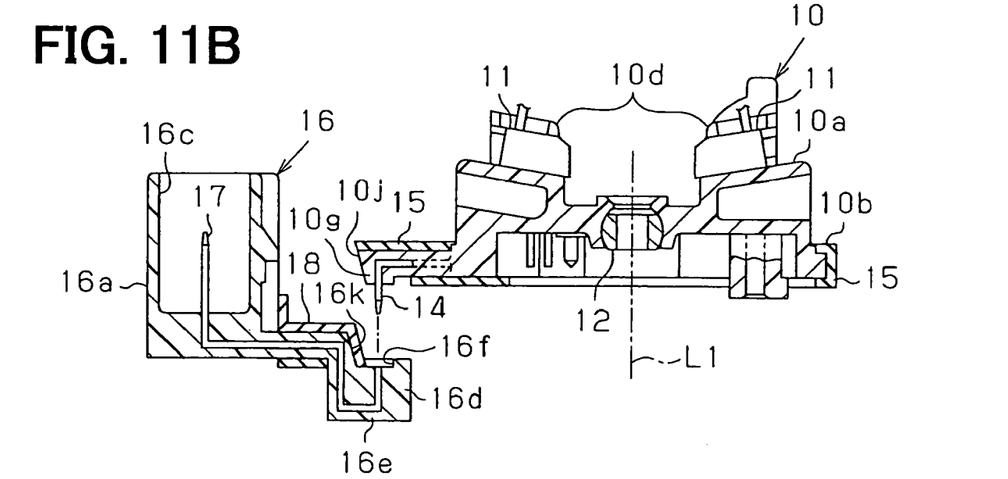

An eighth embodiment illustrated in FIGS. 11A and 11B is a modification to the second embodiment illustrated in FIGS. 4A and 4B. That is, the outside end of the holder-side connecting portion 10g in the radial direction is constituted as a tapered face 10j. The tapered face 10j is a surface so inclined that its upper end is radially protruded more outward than its lower end. The connector portion 16 is correspondingly constructed. More specific description will be given. Its portion opposed to the outside end of the holder-side connecting portion 10g in the radial direction where the tapered face 10j is formed is constituted as a tapered face 16k corresponding to the tapered face 10j. 16k is coated with the sealing member 18. Thereby, the following advantage is brought when the holder-side connecting portion 10g is fitted into the coupling recess 16f: the outside end of the holder-side connecting portion 10g in the radial direction and the connector portion 16 are prevented from interfering with each other. As a result, this fitting operation is facilitated as compared with the second embodiment illustrated in FIGS. 4A and 4B.

As mentioned above, the first embodiment is constructed in such a shape that the connector-side connecting portion 16b is engaged with the brush holder 10 in the direction orthogonal to the rotatable shaft 7. Thereby, the connector portion 16 is restrained from moving in this direction. However, the connector-side connecting portion 16b need not be engaged if not required.

In the first embodiment mentioned above, the connecting portions 10c and 16b of the brush holder 10 and the connector portion 16 are so provided that they are positioned between the two screws 13, which serve as the fixing portions. However, the present invention is not limited to this constitution, and, for example, only one screw 13 may be provided in proximity to the connecting portions 10c and 16b.

The first embodiment mentioned above is so constructed that the connecting portions 10c and 16b of the brush holder 10 and the connector portion 16 are mechanically and electrically connected together at a time. However, mechanical connection and electrical connection need not be simultaneously provided.

The first embodiment mentioned above is provided with the sealing member 15 and 18 for sealing the area between the yoke housing 4 and the gear housing 21. These sealing members are integrally formed on the predetermined portions of the brush holder 10 and the connector portion 16. (The predetermined portions include the clamping portion 10b, holder-side connecting portion 10c, and connector-side connecting portion 16b.) However, the sealing members 15 and 18 may be separated. The positions in which the sealing members 15 and 18 are provided are not limited to the foregoing, and may be changed as appropriate.

In the first embodiment mentioned above, the clutch 24 is placed between the rotatable shaft 7 and the worm shaft 22. However, the clutch 24 may be omitted. In this case, the rotatable shaft 7 and the worm shaft 22 may be integrated with each other.

In the first embodiment mentioned above, the commutator 9 is housed inside the yoke housing 4. However, the commutator 9 may be disposed on the rotatable shaft 7 outside the yoke housing 4.

The above description of the first embodiment relates to a motor 1 that is used as a driving source for a power window device for vehicles. However, the present invention may be applied to motors used in other devices in a vehicle or motors used in other devices than those for vehicles.

What is claimed is:

1. A motor comprising:
   a yoke housing that rotatably supports an armature therein, wherein the armature has a rotatable shaft and a commutator;
   a gear housing that is integrally assembled to the yoke housing and houses a speed reducing mechanism for decelerating rotation of the rotatable shaft;
   a brush holder that holds brushes in slidable contact with the commutator and has a connecting portion; and
   a connector that supplies power from an external source to the brushes through a connecting portion of the connector, which is directly joined to the connecting portion of the brush holder at a location radially outward of an opening of the yoke housing to make electrical and mechanical connection with the connecting portion of the brush holder, wherein the connecting portion of the brush holder and the connecting portion of the connector are clamped between the yoke housing and the gear housing.

2. The motor according to claim 1, wherein:
   the yoke housing and the gear housing are assembled together in a direction of an axis of the rotatable shaft, and
   the connecting portion of the brush holder and the connecting portion of the connector are connected with each other in the direction of the axis of the rotatable shaft.

3. The motor according to claim 1, wherein the connector has a restraining portion for restraining movement in a direction orthogonal to the rotatable shaft.

4. The motor according to claim 1, further comprising a plurality of fixing portions, which fix the yoke housing to the gear housing, wherein the connecting portion of the brush holder and the connecting portion of the connector are positioned between at least two of the fixing portions.

5. The motor according to claim 1, wherein:
   the brush holder has connecting terminals, and the connector has connecting terminals, which are electrically connected with the connecting terminals of the brush holder; and
   concurrently with mechanical connection of the connecting portion of the brush holder and the connecting portion of the connector, the connecting terminals of the brush holder and the connecting terminals of the connector are connected with each other, and thereby the connecting portion of the brush holder and the connecting portion of the connector are electrically connected with each other.

6. The motor according to claim 1, wherein at least one of the brush holder and the connector has a sealing member for sealing between the yoke housing and the gear housing.

7. The motor according to claim 1, wherein the connector includes a control portion, which is integrally provided in the connector and controls rotation of the motor.

8. The motor according to claim 1, wherein:
   the connector has a first engaging portion; and
   the gear housing has a second engaging portion, which is engaged with the first engaging portion in a direction of an axis of the rotatable shaft.

9. The motor according to claim 1, wherein:
   the yoke housing and the gear housing are secured to each other by a plurality of screws; and
   two of the plurality of screws are positioned adjacent to the connecting portion of the brush holder and the connecting portion of the connector to securely hold the connecting portion of the brush holder and the connecting portion of the connector between the yoke housing and the gear housing.

10. The motor according to claim 1, wherein the gear housing has a recess, which is located radially outward of the opening of the yoke housing and receives the connecting portion of the brush holder and the connecting portion of the connector.

11. The motor according to claim 1, wherein an entire radial extent of the connector is displaced from the opening of the yoke housing in a radial direction of the rotatable shaft.

12. A method for manufacturing a motor that has:
- a yoke housing that rotatably supports an armature therein, wherein the armature has a rotatable shaft and a commutator;
- a gear housing that is integrally assembled to the yoke housing and houses a speed reducing mechanism for decelerating the rotation of the rotatable shaft;
- a brush holder that holds brushes in slidable contact with the commutator and has a connecting portion; and
- a connector that has a connecting portion for electrical and mechanical connection with the connecting portion of the brush holder and is for supplying the brushes with power from an external source, wherein:

the connector has a first engaging portion; and the gear housing has a second engaging portion to be engaged with the first engaging portion, the method comprising:

engaging the first engaging portion of the connector with the second engaging portion of the gear housing to engage the connector portion with the gear housing; and clamping the connecting portion of the brush holder and the connecting portion of the connector between the yoke housing and the gear housing in a manner such that the connecting portion of the brush holder and the connecting portion of the connector are joined together to form the electrical and mechanical connection at a location radially outward of an opening of the yoke housing.

* * * * *